(12) United States Patent
Stacey et al.

(10) Patent No.: US 9,730,103 B2
(45) Date of Patent: *Aug. 8, 2017

(54) SINGLE MPDU FRAME SIGNALING

(71) Applicant: Intel Corporation, Santa Clara, CA (US)

(72) Inventors: Robert Stacey, Portland, OR (US); Solomon Trainin, Haifa (IL); Adrian Stephens, Cambridge (GB)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,706

(22) Filed: Jan. 4, 2016

(65) Prior Publication Data
US 2016/0360442 A1 Dec. 8, 2016

Related U.S. Application Data

(63) Continuation of application No. 14/055,804, filed on Oct. 16, 2013, now Pat. No. 9,232,436, which is a continuation of application No. 12/977,522, filed on Dec. 23, 2010, now Pat. No. 8,665,843.

(51) Int. Cl.
 H04W 4/00 (2009.01)
 H04W 28/06 (2009.01)
 H04W 84/12 (2009.01)

(52) U.S. Cl.
 CPC .......... *H04W 28/065* (2013.01); *H04W 28/06* (2013.01); *H04W 84/12* (2013.01)

(58) Field of Classification Search
 CPC ...... H04W 28/065; H04W 28/06; H04W 4/00
 USPC ........................................................ 370/338
 See application file for complete search history.

(56) References Cited

U.S. PATENT DOCUMENTS

| 2011/0134816 A1* | 6/2011 | Liu ........................... H04L 1/06 370/310 |
| 2012/0201196 A1* | 8/2012 | Merlin ................ H04W 28/065 370/328 |
| 2012/0207087 A1* | 8/2012 | Wentink ................ H04L 1/1621 370/328 |

\* cited by examiner

*Primary Examiner* — Sai-Ming Chan

(57) ABSTRACT

Embodiments of systems and methods for providing single MPDU frame signaling are generally described herein. Other embodiments may be described and claimed.

22 Claims, 5 Drawing Sheets

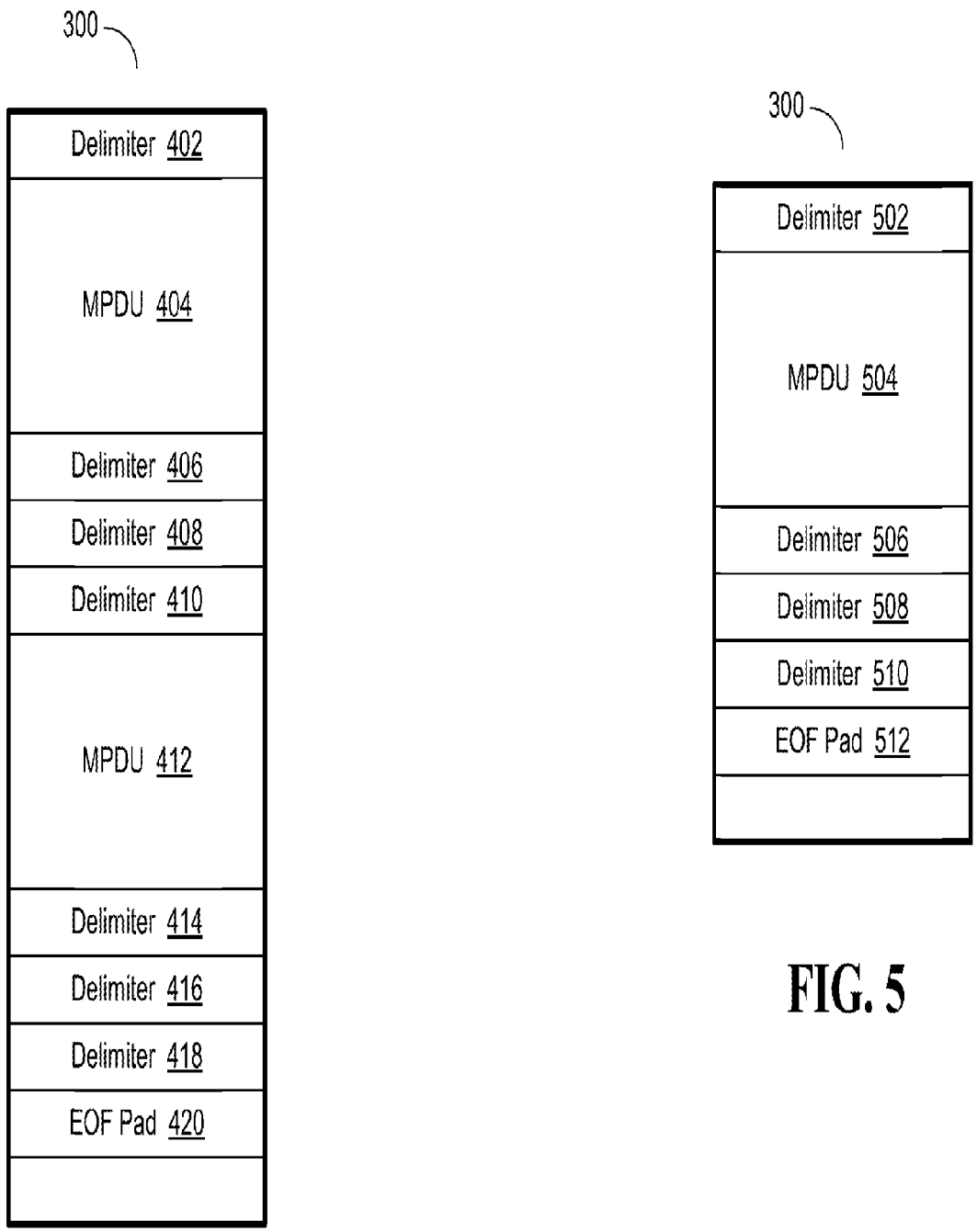

SINGLE MPDU FRAME SIGNALING

CROSS-REFERENCE TO RELATED APPLICATIONS

This application is a continuation of, claims the benefit of and priority to, previously filed U.S. patent application Ser. No. 14/055,804 filed on Oct. 16, 2013, entitled "SINGLE MPDU FRAME SIGNALING", which is a continuation of previously filed U.S. patent application Ser. No. 12/977,522 filed on Dec. 23, 2010, and subsequently issued as U.S. Pat. No. 8,665,843 on Mar. 4, 2014; the subject matter of all of the above is hereby incorporated by reference in its entirety.

FIELD OF THE INVENTION

This application relates to wireless systems and, more particularly, to systems and methods for media access control (MAC) protocol data unit (MPDU) signaling in a wireless environment.

BACKGROUND

An increased throughput, e.g., above 1 Gigabit-per-second (Gbps) per wireless communication can be necessary to transfer data within wireless communication networks, such as, for example, wireless local area networks (WLAN) and/or wireless personal area networks (WPAN). The increased throughput may be achieved by using a communication link having a wide bandwidth. For example, a bandwidth of 80 Mega-Hertz (MHz) or more may be required to provide a throughput greater than 1 Gbps, e.g., in a network operating over a frequency band of 5 Giga-Hertz (GHz) in accordance with the IEEE 802.11 standards.

Increased throughput may also be supported by reducing signaling requirements and decreasing an amount of overhead used for the transmission and reception of data in the wireless communication network.

BRIEF DESCRIPTION OF THE DRAWINGS

The present invention is illustrated by way of example and not as a limitation in the figures of the accompanying drawings, in which:

FIG. 4 is a block diagram illustration of an A-MPDU frame comprising multiple MPDUs, in accordance with some demonstrative embodiments;

FIG. 5 is a block diagram illustration of an A-MPDU frame comprising a single MPDU, in accordance with some demonstrative embodiments.

DETAILED DESCRIPTION

Figure 1:
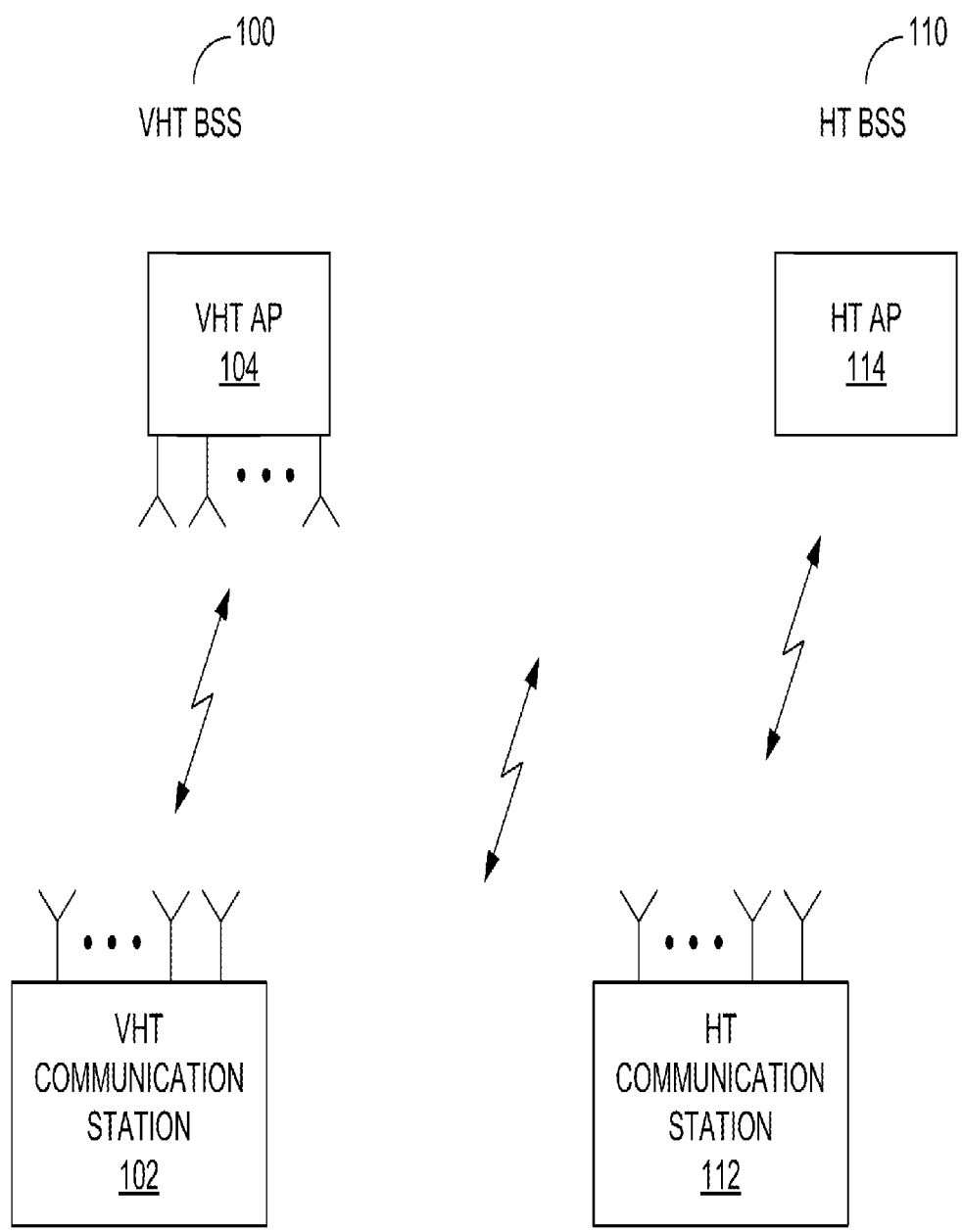
FIG. 1 is an schematic block diagram illustration of neighboring wireless communication networks, in accordance with some demonstrative embodiments.

In the following detailed description, numerous specific details are set forth to provide a thorough understanding of embodiments of the invention. However it will be understood by those skilled in the art that embodiments of the invention may be practiced without these specific details. In other instances, well-known methods, procedures, components and circuits have not been described in detail so as not to obscure embodiments of the invention.

Unless specifically stated otherwise, as apparent from the following discussions, it is appreciated that throughout the specification discussions utilizing terms such as "processing," "computing," "calculating," "determining," "selecting," "decoding," or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

The following detailed description describes various embodiments for communicating over a number of channels in wireless networks to communicate packets, such as Physical Layer Convergence Protocol (PLCP) protocol data units (PPDUs) using a wireless device, platform, user equipment (UE), station (STA), subscriber station (SS), mobile station (MS), advanced mobile station (AMS), high throughput (HT) station (STA), or very HT STA (VHT STA). The various forms of devices described above such as the platform, UE, SS, MS, HT STA, and VHT STA may be interchanged and reference to a particular device does not preclude other devices from being substituted in various embodiment(s). The device may communicate in a network with one or more other devices such as a base station (BS), access point (AP), node, node B, or enhanced node B (eNB). Further, these terms may be conceptually interchanged, depending on which wireless protocol is being used in a particular wireless network, so a reference to BS herein may also be seen as a reference to either of ABS, eNB, or AP as one example. Similarly, a reference to a STA or MS herein may also be seen as a reference to either of HT STA, VHT STA, or SS as another example. Reference to a particular device does not preclude other devices from being substituted in various embodiment(s).

Some embodiments may be used in conjunction with various fixed and/or mobile devices, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an onboard device, an off-board device, a hybrid device, and a vehicular device.

Further, embodiments of the invention may be used in one or more wired or wireless networks, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 (IEEE Standard for Information technology—Telecommunications and information exchange between systems—Local and metropolitan area networks—Specific requirements, Part 11: Wireless LAN Medium Access Control (MAC) and Physical Layer (PHY) Specifications—June 2007), 802.11n, 802.11 task group ac (TGac), 802.11ac, 802.11 task group ad (TGad) ("the 802.11 standards"), 802.16 (IEEE-Std 802.16, 2004 Edition, Air Interface for Fixed Broadband Wireless Access Systems), 802.16d, 802.16e (IEEE-Std 802.16e, 2005 Edition, Physical and Medium Access Control Layers for Combined Fixed and Mobile Operation in Licensed Bands), 802.16f, 802.16m standards ("the 802.16 standards") and/or future versions and/or derivatives thereof, devices and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks.

In the field of communications, including wireless communications, it would be helpful to provide devices and methods for the use of wideband transmissions in wireless environments, wherein the wideband transmissions use reduced overhead signaling to enable more efficient transmission of data in the wireless environment. As an example, wireless communications using IEEE 802.11n as the communications protocol includes a frame that is formatted with an aggregate bit in a HT-signal (SIG) field set to 0 (zero), wherein the frame comprises a single MPDU. Alternately, the 802.11n protocol also includes a frame that is formatted with the aggregate bit in the HT-SIG field set to one which carries an A-MPDU payload comprising a number of MPDUs. The format differences in the frames of 802.11n affect acknowledgement rules, wherein a quality of service (QoS) data MPDU with an acknowledgment (Ack) policy field set to "normal Ack" solicits an Ack response if the MPDU is carried in a frame with the aggregate bit set to 0 (zero), but solicits a block Ack (BA) response if the MPDU is carried in a frame with the aggregate bit set to one.

The use of a separate bit to prompt an acknowledgement type in response to a transmission can impact space limitations within the transmission, thereby making it undesirable to add a bit to prompt a desired response behavior. It would be helpful to prompt a desired response or acknowledgement behavior without using an additional bit, such as by implementing a signaling protocol based at least in part on a structure of a frame. In embodiments, a signaling method is proposed for signaling that a single MPDU is carried in an A-MPDU, as indicated by a frame structure or frame characteristics. The signaling method can then be used to solicit or prompt a desired acknowledgement behavior.

Turning now to the figures, FIG. 1 illustrates neighboring wireless communication networks in accordance with some embodiments. The neighboring wireless communication networks include two or more basic service sets (BSS), such as very-high throughput (VHT) BSS 100 and high-throughput (HT) BSS 110. VHT BSS 100 may include VHT access point (AP) 104 and one or more VHT communication stations (STA) 102, and HT BSS 110 may include neighboring HT AP 114 and one or more HT communication stations (STA) 112. In an embodiment, VHT BSS 100 is configured to operate in accordance with IEEE 802.11ac and the HT BSS 110 is configured to operate in accordance with IEEE 802.11n. Other wireless protocols may be used in additional embodiments.

VHT BSS 100 may utilize a primary channel and up to three or more secondary channels. HT BSS 110, on the other hand, may be limited to using a primary channel and a single secondary channel. In accordance with some embodiments, VHT communication station 102 may be configured to communicate a data unit, such as a physical layer convergence procedure (PLCP) protocol data unit (PPDU), on a primary channel and up to three or more secondary channels, and HT communication station 112 may be configured to communicate a PPDU on a primary channel and up to one secondary channel.

Figure 2:
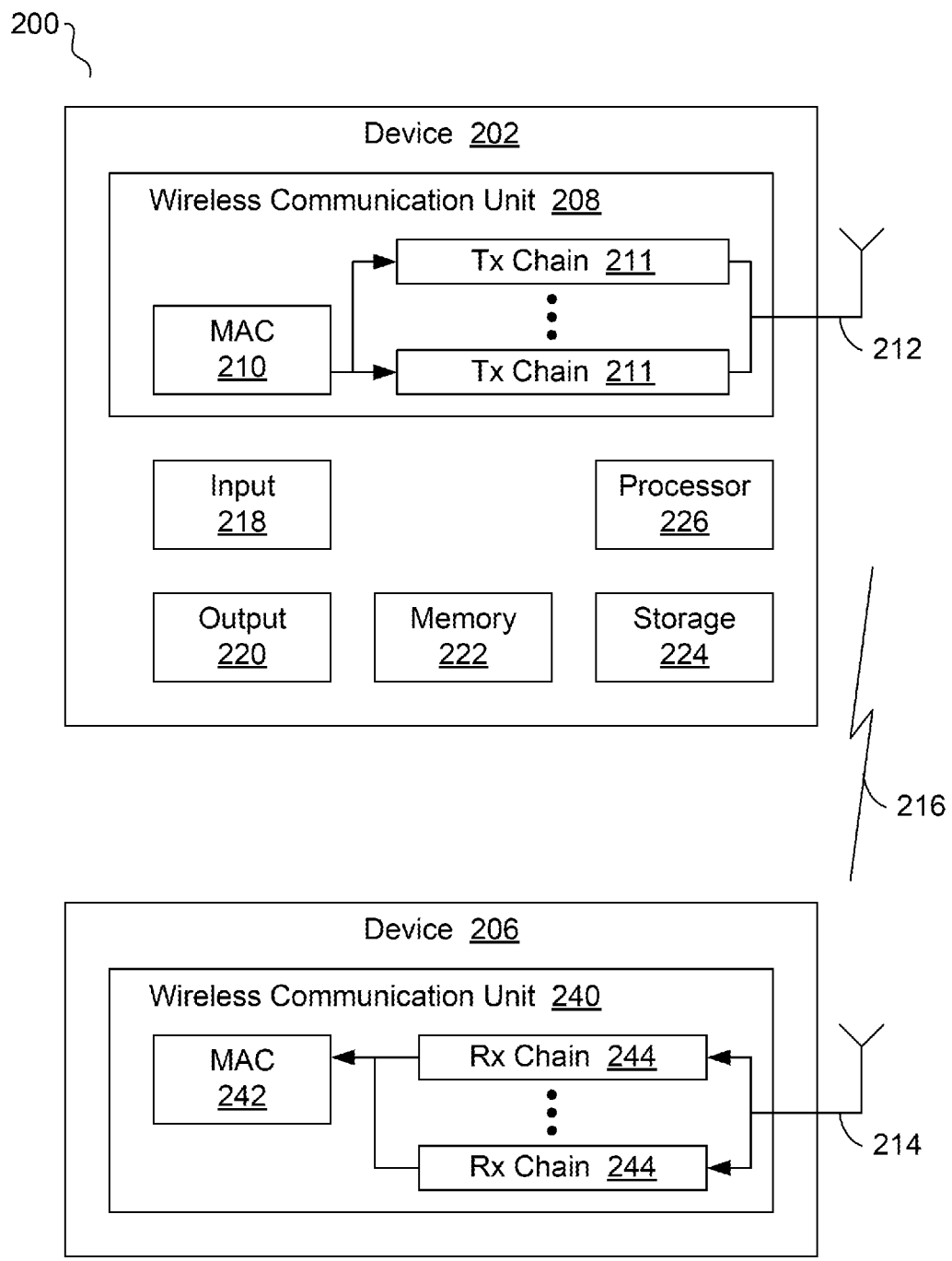
FIG. 2 is a schematic block diagram illustration of a system, in accordance with some demonstrative embodiments.

Reference is now made to FIG. 2, which schematically illustrates a block diagram of a system 200 in accordance with some demonstrative embodiments. In some demonstrative embodiments, system 200 may include one or more wireless communication devices, e.g., wireless communication devices 202 and/or 206, capable of communicating content, data, information and/or signals over a wireless communication link 216. One or more elements of system 200 may optionally be capable of communicating over any suitable wired communication links.

In some demonstrative embodiments, wireless communication devices 202 and/or 206 may include embodiments of the various devices described earlier including the VHT STA 102, the VHT AP 104, the HT STA 112, and the HT AP 114. In some demonstrative embodiments, device 202 may include a wireless communication unit 208 to transmit, via one or more antennae 212, a wireless transmission to device 206 over wireless communication link 216. Device 206 may include a wireless communication unit 240 to receive the wireless transmission via one or more antennae 214. Types of antennae that may be used for antennae 212 and/or 214 may include but are not limited to internal antenna, dipole antenna, omni-directional antenna, a monopole antenna, an end fed antenna, a circularly polarized antenna, a micro-strip antenna, a diversity antenna and other antenna types known to one skilled in the art.

In some demonstrative embodiments, wireless communication devices 202 and/or 206 may also include, for example, one or more of a processor 226, an input unit 218, an output unit 220, a memory unit 222, and a storage unit 224. Wireless communication devices 202 and/or 206 may optionally include other suitable hardware components and/or software components. In some demonstrative embodiments, some or all of the components of each of wireless communication devices 202 and/or 206 may be enclosed in a common housing or packaging, and may be interconnected or operably associated using one or more wired or wireless links. In other embodiments, components of each of wireless communication devices 202 and/or 206 may be distributed among multiple or separate devices.

Processor 226 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 226 executes instructions, for example, of an Operating System (OS) of wireless communication devices 202 and/or 206 and/or of one or more suitable applications.

Input unit 218 includes, for example, a touchscreen, a keyboard, a keypad, a mouse, a touch-pad, a track-ball, a stylus, a microphone, or other suitable pointing device or input device. Output unit 220 includes, for example, an audio system and/or a video display.

Memory unit 222 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 224 includes, for example, a hard disk drive, a floppy disk drive, a Compact Disk (CD) drive, a CD-ROM drive, a DVD drive, or other suitable removable or non-removable storage units. Memory unit 222 and/or storage unit 224, for example, may store data processed by wireless communication device 202 and/or 206.

In some demonstrative embodiments, wireless communication unit 208 may include a plurality of transmit (Tx) chains 211 to transmit the wireless transmission over the plurality of wireless communication channels. Wireless communication unit 240 may include a plurality of receive (Rx) chains 244 to receive the wireless transmission over the plurality of wireless communication channels. In some demonstrative embodiments, Tx chains 211 and/or Rx chains 244 may include any suitable Physical-layer (PHY) chains and/or components; any suitable Radio-Frequency (RF) chains and/or components; and/or any other suitable elements.

In some demonstrative embodiments, wireless communication unit 208 may include a media-access-controller (MAC) 210, e.g., a single MAC, to commonly control the transmissions via Tx chains 211; and/or wireless communication unit 240 may include a MAC 242, e.g., a single MAC, to commonly control the reception via Rx chains 244, e.g., as described in detail below.

In some demonstrative embodiments, MAC 210 may control Tx chains 211 to simultaneously transmit symbols of a wireless communication packet over the number of wireless communication channels of wireless communication link 216. MAC 242 may control Rx chains 244 to simultaneously receive the symbols of the wireless communication packet over the number of wireless communication channels of wireless communication link 216.

Figure 3:
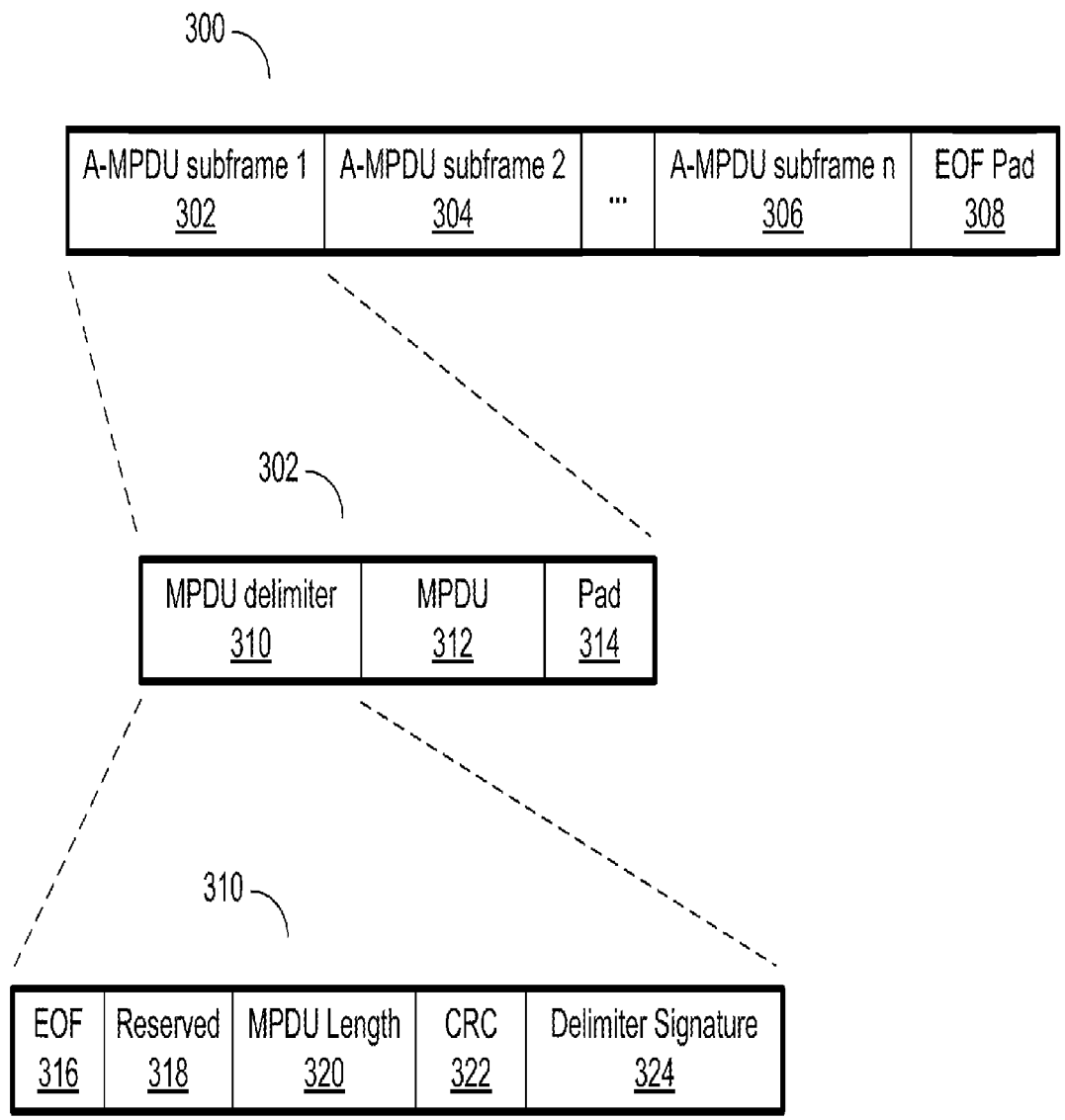
FIG. 3 is a block diagram illustration of an aggregate MPDU (A-MPDU) frame structure, in accordance with some demonstrative embodiments.

FIG. 3 is a block diagram illustration of an A-MPDU 300 frame used, for example, in an 802.11ac communication link comprising a sequence of a number of A-MPDU subframes including A-MPDU subframe 1 302, A-MPDU subframe 2 304, through and including A-MPDU subframe n 306, along with an end of frame (EOF) pad 308. The number of subframes used in a particular communication is variable and can include one or more subframes per A-MPDU 300 frame. An aggregate bit is not needed to signal a format of a payload in the A-MPDU 300 frame that is consistent with an 802.11ac communications protocol.

The EOF pad 308 may contain bits to fill-out the A-MPDU 300 frame, for example 0 to 3 octets in length, wherein each octet represents 8 bits. The A-MPDU subframe 1 302 is detailed further in FIG. 3 to show a subframe structure, wherein in this embodiment the A-MPDU 302 comprises an MPDU delimiter 310, an MPDU 312, and a pad 314. The A-MPDU 302 is illustrated having one MPDU 312, however the embodiment is not so limited and alternately may contain none or more than one MPDU 312. The MPDU 312 may comprise data having a variable length and may be subject to a maximum length measured in octets depending on applicable wireless protocol limitations.

The pad 314 is appended to the A-MPDU subframe 1 302 and is 0 to 3 octets in length in one embodiment. The pad 314 may contain additional octets or the A-MPDU subframe 1 302 may not comprise a pad 314 in other embodiments. The MPDU delimiter 310 is also illustrated further to detail a delimiter structure, wherein in this embodiment the MPDU delimiter 310 comprises an EOF field 316, a reserved field 318, an MPDU length 320, a cyclic redundancy check (CRC) field 322, and a delimiter signature 324.

The EOF field 316 is an indication field that may contain a number of bits, wherein in an embodiment a bit is set to 1 (one) in all zero length A-MPDU subframes following a last non-zero length A-MPDU subframe in a VHT PPDU. The EOF field 316 may be set to 1 (one) in a single A-MPDU subframe such as A-MPDU subframe 1 320 in an embodiment having a non-zero length. The EOF field 316 is set to 0 (zero) otherwise. The reserved field 318 is left available for a number of bits to indicate a status or for signaling purposes. The MPDU length 320 indicates a length of the MPDU 312, wherein the length may be expressed in octets and may be 14 bits in length, wherein a number of the 14 bits may be high order bits and a number of the 14 bits are low order bits in an embodiment. The CRC field 322 is a field having a length in bits, such as 8 bits, to provide a CRC 322 of one or more preceding bits. The delimiter signature 324 in an embodiment is a pattern, which may be a unique pattern that can be used to detect an MPDU delimiter 310, such as when a wireless communication device 202 is scanning for an MPDU delimiter 310.

FIG. 4 is a block diagram illustration of an A-MPDU frame 300 comprising multiple MPDUs 312 of FIG. 3, in accordance with some demonstrative embodiments. An A-MPDU 300, described earlier in embodiments in reference to FIG. 3, comprises a number of MPDUs 312 and MPDU delimiters 310. The A-MPDU 300 of FIG. 4 comprises MPDU 404 and MPDU 412, an EOF pad 420, and a plurality of MPDU delimiters 310. Delimiter 402 is followed by MPDU 404, so the delimiter 402 is configured with the MPDU length 320 greater than 0 (zero) to signal the payload of MPDU 404, and the EOF field 316 in the delimiter 402 is set to 0 (zero). The MPDU 404 is followed by delimiters 406, 408 and 410. As an example, delimiter 408 is configured with the MPDU length 320 set to 0 (zero) since the delimiter 408 is followed by another delimiter 410, and the EOF field 316 in delimiter 408 is also set to 0 (zero). MPDU 412 is followed by delimiters 414, 416, and 418 wherein delimiter 416 and delimiter 418 is, for example, configured with the MPDU length 320 set to 0 (zero) and the EOF field 316 set to 1 (one).

FIG. 5 is a block diagram illustration of an A-MPDU frame comprising a single MPDU 312, in accordance with some demonstrative embodiments. The A-MPDU 300 in these embodiments comprise a single MPDU 312, a plurality of MPDU delimiters 310, and an EOF pad 512 as described in reference to FIG. 3. Delimiter 502 is followed by a single MPDU 504 in the A-MPDU 300, so the delimiter 502 is configured with the MPDU length 320 greater than 0 (zero) to signal the payload of MPDU 504 and the EOF field 316 set to 1 (one). The MPDU 504 is followed by delimiter 506, delimiter 508 and delimiter 510. As an example, delimiters 508 and 510 are configured with the MPDU length 320 set to 0 (zero) and the EOF field 316 is set to 1 (one).

As described in reference to FIG. 5, an A-MPDU 300 frame structure is provided to prompt or solicit a desired acknowledgement behavior from a receiver such as the wireless communication device 206 of FIG. 2 based at least in-part on the frame structure. In embodiments, the EOF field 316 is used in combination with the MPDU length 320 to signal characteristics of the A-MPDU 300, which may be used to solicit a desired acknowledgement behavior.

In an embodiment, when the EOF field 316 is set to 1 (one) and the MPDU length is greater than 0 (zero) in an MPDU delimiter 310 of delimiter 502, this configuration is used to indicate that the A-MPDU 300 has only one MPDU 312 and that no other MPDUs 312 are present in the A-MPDU 300. Further, where the EOF field 316 is set to 1 (one) and the MPDU length is greater than 0 (zero) in an MPDU delimiter 310, wherein an Ack policy is set to "normal ack," then an ACK response is expected from a receiving device such as the wireless communication device 206. The MPDU 312 in this embodiment may be a quality of service (QoS) Data MPDU, however the embodiment is not so limited. In an alternate embodiment where the EOF field 316 is set to 0 (zero) and the MPDU length is greater than 0 (zero) in an MPDU delimiter 310, wherein an Ack policy is set to "normal ack," then a block Ack (BA) response is expected from the receiving device.

For the embodiment having the EOF field 316 is set to 1 (one) and the MPDU length is greater than 0 (zero) in an MPDU delimiter 310 to represent a single MPDU 312 in the A-MPDU 300, the EOF field 316 in combination with MPDU length 320 greater than 0 (zero) structure is used to signal that there are no additional MPDUs 312 in the A-MPDU 300 frame. No additional signaling bits, such as aggregate bits, are necessary to indicate that A-MPDU 300 contains a single MPDU 312.

In embodiments, the EOF field 316 can be established based on a number of criteria. For example, a padding delimiter is a delimiter with a length=0 (zero) and an EOF field 316 in a padding delimiter that occurs between MPDUs 312 can be set to 0 (zero). The EOF field 316 in a padding delimiter at the end of the A-MPDU 300, following all MPDUs 312 in the A-MPDU 300, can be set to 1 (one). Further an MPDU delimiter 310 that delimits, or immediately precedes an MPDU 312 has a length greater than 0 (zero) if the MPDU 312 is greater than 0 (zero). Also, for an A-MPDU 300 that has more than one MPDU 312, delimiters that precede an MPDU 312 can have the EOF field 316 set to 0 (zero). For an A-MPDU 300 that carries a single MPDU 312, an MPDU delimiter 310 in the A-MPDU 300 may have the EOF field 316 set to one. A transmitter such as the VHT AP 104 or the VHT communication station 102 of FIG. 1 may set the EOF field 316 to 1 (one) to solicit an Ack response to a QoS data frame with an Ack policy equal to "normal ack." The EOF field 316 may be set to 0 (zero) if a block acknowledgement (BA) response is expected.

Figure 6:
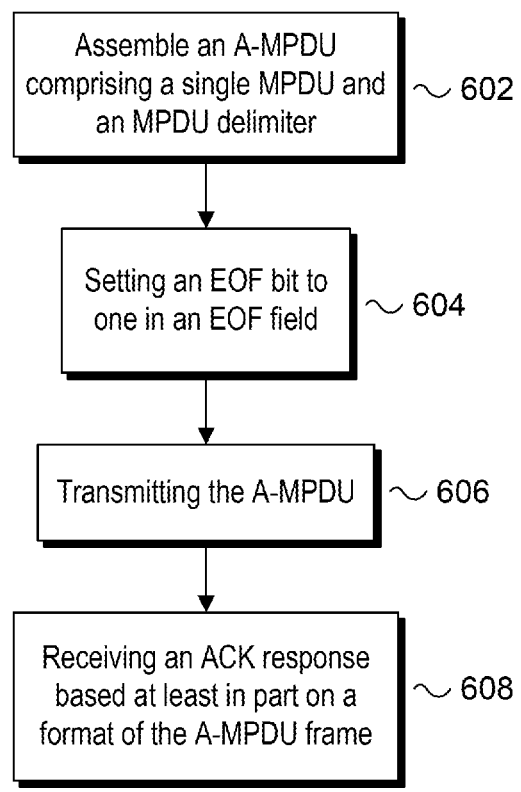
FIG. 6 is a block diagram illustration of methods for single MPDU frame signaling, in accordance with some demonstrative embodiments.

FIG. 6 is a block diagram illustration of methods for single MPDU 312 frame signaling of an A-MPDU 300, in accordance with some demonstrative embodiments. The methods include assembling the A-MPDU 300, for example using a wireless communication unit 208, by combining a single MPDU 312 with an MPDU delimiter 310 in element 602, wherein the MPDU delimiter 310 comprises an end of frame (EOF) field 316 and a MPDU length 320 field, wherein the MPDU length is greater than zero. An EOF bit is set to one in the EOF field 316 in element 604. The A-MPDU 300 is transmitted over an antenna 212 in element 606. An acknowledgement (ACK) response is received in element 608 based at least in-part on a structure of the A-MPDU 300 frame, wherein the structure comprises an EOF field 316 set to one and an MPDU length 320 field having a length greater than zero. In these embodiments, an aggregate bit is not used to signal a format of the A-MPDU.

In some embodiments, the MPDU delimiter 310 may further comprise one or more of a reserved field 318, a cyclic redundancy check 322 field, and a delimiter signature 324 field. Also, the single MPDU 312 may be a quality of service data MPDU with an acknowledgement policy set to normal acknowledgement and the A-MPDU 312 may be transmitted by a VHT STA 102 using an 802.11ac communication protocol in some embodiments.

The operations discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within embodiments of the invention.

The invention claimed is:

1. A method to communicate a media access control (MAC) protocol data unit (MPDU) in an aggregate MPDU (A-MPDU), comprising:
    transmitting the A-MPDU using a wireless communication unit wherein the A-MPDU comprises no more than one non-zero length MPDU preceded by an MPDU delimiter, wherein the non-zero length MPDU is a quality of service data MPDU with an acknowledgement policy set to normal acknowledgement, wherein the MPDU delimiter comprises an end of frame (EOF) field and an MPDU length field indicating an MPDU length, the MPDU length field preceded by the EOF field; and
    wherein an EOF bit in the EOF field indicates that the A-MPDU includes no more than one non-zero length MPDU.

2. The method of claim 1, wherein the MPDU delimiter further comprises a reserved field, a cyclic redundancy check field, and a delimiter signature field.

3. The method of claim 1, wherein an aggregate bit is not used to signal a structure of the A-MPDU for an acknowledgement.

4. The method of claim 1, wherein the A-MPDU is transmitted by a VHT STA using an 802.11ac communication protocol.

5. The method of claim 1, wherein the A-MPDU further comprises padding.

6. The method of claim 1, the MPDU delimiter to further comprise a reserved field and a cyclic redundancy check (CRC) field, the EOF field having a 1-bit length, the reserved field having a 1-bit length, the MPDU length field having a 14-bit length, and the CRC field having an 8-bit length.

7. A very high throughput (VHT) wireless communications station comprising a media-access-controller to transmit a media access control (MAC) protocol data unit (MPDU) in an aggregate MPDU (A-MPDU), wherein the MPDU is a quality of service data MPDU with an acknowledgement policy set to normal acknowledgement, wherein the transmitted A MPDU comprises an end of frame (EOF) field to indicate that the A-MPDU contains no more than one non-zero length MPDU and further comprises a length field indicating a length of the non-zero length MPDU, the length field to precede the EOF field.

8. The VHT station of claim 7, wherein the EOF field is set to one in all zero length MPDUs following the non-zero length MPDU.

9. The VHT station of claim 7, wherein the EOF field is positioned within an MPDU delimiter that further comprises the length field to indicate the non-zero length.

10. The VHT station of claim 7, wherein the EOF field is positioned within an MPDU delimiter that further comprises the length field to indicate the non-zero length, the MPDU delimiter to further comprise a reserved field and a cyclic redundancy check (CRC) field, the EOF field having a 1-bit length, the reserved field having a 1-bit length, the MPDU length field having a 14-bit length, and the CRC field having an 8-bit length.

11. The VHT station of claim 7, further comprising an antenna to transmit the A MPDU and to receive an acknowledgement (ACK) response to the A-MPDU.

12. The VHT station of claim 7, wherein the station is configured to communicate using an 802.11ac communication protocol.

13. The VHT station of claim 7, wherein the A-MPDU comprises padding.

14. A machine-accessible non-transitory medium that provides instructions, which when accessed cause a machine to perform operations, comprising:
transmit no more than one non-zero length media access control (MAC) protocol data unit (MPDU) in an aggregate MPDU (A-MPDU), wherein the non-zero length MPDU is a quality of service data MPDU with an acknowledgement policy set to normal acknowledgement, wherein the A-MPDU comprises an end of frame (EOF) field to indicate that the A-MPDU contains no more than one non-zero length MPDU and a length field to indicate a length of the no more than one non-zero length MPDU, the length field to precede the EOF field.

15. The machine accessible medium of claim 14, wherein the EOF field is set to one in all zero length MPDUs following the non-zero length MPDU.

16. The machine accessible medium of claim 14, wherein the EOF field is positioned within an MPDU delimiter that further comprises the length field indicating the non-zero length.

17. The machine accessible medium of claim 14, wherein the EOF field is positioned within an MPDU delimiter that further comprises the length field to indicate the non-zero length, the MPDU delimiter to further comprise a reserved field and a cyclic redundancy check (CRC) field, the EOF field having a 1-bit length, the reserved field having a 1-bit length, the MPDU length field having a 14-bit length, and the CRC field having an 8-bit length.

18. The machine accessible medium of claim 14, wherein the A-MPDU comprises padding.

19. A method to communicate a media access control (MAC) protocol data unit (MPDU) in an aggregate MPDU (A-MPDU), comprising:
transmitting the A-MPDU using a wireless communication unit wherein an A-MPDU subframe of the A-MPDU comprises a MPDU, wherein the MPDU is a quality of service data MPDU with an acknowledgement policy set to normal acknowledgement, the MPDU preceded by an MPDU delimiter comprising an end of frame (EOF) field and a MPDU length field, the MPDU length field preceded by the EOF field; and
wherein values for the EOF field and the MPDU length field indicate whether the MPDU is a single MPDU within the A-MPDU subframe of the A-MPDU.

20. The method of claim 19, wherein the MPDU is a single MPDU within the A-MPDU subframe of the A-MPDU when the EOF bit in the EOF field is set to a nonzero value and the MPDU length field bits are set to a nonzero value.

21. The method of claim 19, wherein the MPDU within the A-MPDU subframe of the A-MPDU is an end of frame when an EOF bit in the EOF field is set to a nonzero value and MPDU length field bits are set to a zero value.

22. The method of claim 19, the MPDU delimiter to further comprise a reserved field and a cyclic redundancy check (CRC) field, the EOF field having a 1-bit length, the reserved field having a 1-bit length, the MPDU length field having a 14-bit length, and the CRC field having an 8-bit length.

* * * * *